United States Patent [19]

Oakes

[11] 3,758,222
[45] Sept. 11, 1973

[54] DRILL BIT

[76] Inventor: Harry C. Oakes, P.O. Box 331, Wyoming, N.Y. 14591

[22] Filed: Dec. 30, 1971

[21] Appl. No.: 214,054

[52] U.S. Cl. ............................................... 408/224
[51] Int. Cl. ............................................. B23b 51/00
[58] Field of Search ................... 408/224, 225, 223, 408/206

[56] References Cited
UNITED STATES PATENTS

| 2,276,532 | 3/1942 | Welty | 408/224 |
| 2,897,696 | 8/1959 | Tisserant | 408/225 |
| 3,564,945 | 2/1971 | Bradley | 408/224 |

FOREIGN PATENTS OR APPLICATIONS

| 725,505 | 5/1932 | France | 408/223 |

Primary Examiner—Gil Weidenfeld
Attorney—Conrad Christel et al.

[57] ABSTRACT

A drill bit for drilling holes in metal sheets or panels in which the drill is of generally conical form having a series of cylindrical drill portions increasing progressively in diameter from the point end of the drill whereby a single drill may be employed to drill holes of various diameters within a given range. The drill has a single flute of generally right-angle form in cross section with the apex of the right angle extending generally along the axis of the bit. Each cylindrical portion has a beveled end connecting it with the next smaller cylindrical portion and this beveled end extends helically at a relatively small angle to provide the usual axial clearance and to limit the rate of feed of the drill into the work.

1 Claim, 2 Drawing Figures

PATENTED SEP 11 1973 3,758,222

INVENTOR.
HARRY C. OAKES
BY
Christel + Bean
ATTORNEYS derhaps# DRILL BIT

BACKGROUND OF THE INVENTION

This invention relates to drill bits and particularly to drill bits for drilling holes of various sizes in sheet metal or similar plates or panels of moderate thickness.

In the prior art drill bits have been proposed which are generally conical in shape and have a series of stepped cylindrical formations graduated as to size with multiple flutes therealong. By use of such bits holes corresponding to the diameter of any of the stepped cylindrical surfaces may be formed by drilling into the work until the cylindrical formation of the desired diameter passes through the sheet or panel. Thus a hole is formed by successively drilling a series of holes starting with the smallest diameter at the outer end of the drill bit and continuing until the desired diameter is reached.

Drills of this type are exemplified in Tisserant U.S. Pat. No. 2,897,696, dated Aug. 4, 1959 and Bradley U.S. Pat. No. 3,564,945, dated Feb. 23, 1971. The drill bits of these patents have multiple flutes which interrupt the cylindrical portions of the stepped drill to a considerable extent, whereby concentricity of the drill is difficult to maintain and particularly in drilling metal sheets inaccurate drilling results.

SUMMARY OF THE INVENTION

The present invention provides a stepped drill of this general type with a single longitudinal extending flute which provides a single cutting edge for each stepped cylindrical formation of the drill bit. By reason of this design a major portion of each cylindrical formation is continuous and uninterrupted and thus gives maximum bearing surface for each cylindrical formation in the drill hole as such hole is being formed and also during the beginning entry of the next cylindrical formation into the work.

The drill bit of the present invention is further characterized by the provision of a very much limited axial clearance which in turn limits the degree of axial feed of the drill in a given hole since the rate of feed with respect to the rotary speed of the drill cannot extend the helix formed by the axial clearance of the frustoconical leading end of each cylindrical portion of the drill. This is particularly important in hand drilling where the rate of feed is difficult to control and is also especially important in drilling relatively thin metal sheets where drills are prone to chew into and distort the metal instead of properly removing the same by cutting action of the drill bit.

DESCRIPTION OF THE ILLUSTRATED EMBODIMENT

Figure 1:
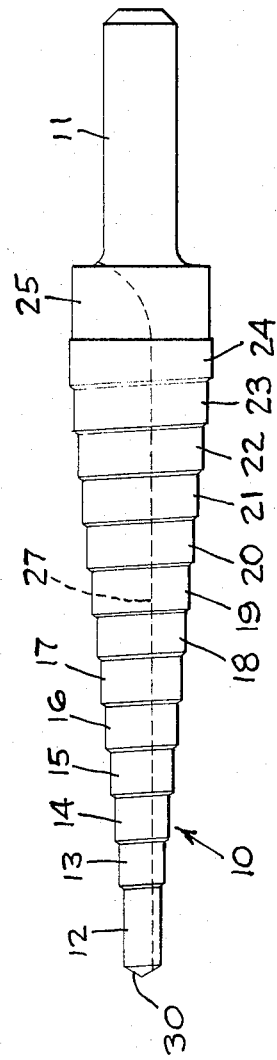
FIG. 1 is a general elevational view of one form of the drill bit of the present invention.
Figure 2:
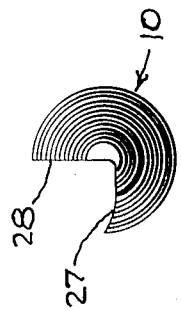
FIG. 2 is an end elevational view taken from the leading end of the drill of FIG. 1.

In the drill bit illustrated in the drawing and described in detail herein by way of example a drill body which is generally conical is designated generally by the reference numeral 10 and has a shank 11 at an end thereof for attachment to a conventional drill chuck. The opposite end of the bit has a generally cylindrical drill portion 12 of smallest diameter, in the present instance one eighth inch.

Extending from portion 12 is a series of drill portions of successively larger diameters designated by the numerals 13 through 24. In the present instance these drill portions increase in diameter by increments of 1/32 of an inch to a maximum of one-half inch. A connecting cylindrical portion 25 is provided between the largest diameter drill portion 24 and shank 11.

A single flute 27 extends along the drill bit parallel to the axis thereof to provide a face 28 which intersects the peripheries of the several drill portions to provide cutting edges. The small end portion 12 is provided with the usual drill point formation 30 and the several portions 13 through 24 each connect with the adjacent smaller diameter portion by way of a similar angular or beveled formation.

It will be noted that the single flute 27 interrupts the periphery of each cylindrical portion by an angle of ninety degrees so that each such portion has 270 degrees of uninterrupted periphery to maintain accurately concentric bearing of all portions of the drill in the work as formation of the hole proceeds.

It will further be noted that the beveled leading end of each cylindrical drill portion is provided with axial clearance so that such beveled leading end extends helically. In the present instance this axial clearance is at an angle of about 3 degrees, or at any rate between 2 and 5 degrees. In a drill of the present type which is employed in large part for drilling sheet metal and is usually hand-held and hand-fed this sharply limited axial clearance serves to prevent feeding of the drill at too rapid a rate for clean drilling and also serves to prevent the drill from tearing into the work, as often occurs in drilling relatively thin metal sheets.

A preferred embodiment has been described herein and shown in the accompanying drawings to illustrate the underlying principles of the invention but it is to be understood that numerous modifications may be made without departing from the broad spirit and scope of the invention.

I claim:

1. A drill bit for drilling holes of various selected diameters in metal sheets comprising a tapered drill body comprising a series of cylindrical portions increasing progressively in diameter from the small end of said body, beveled shoulders connecting the several cylindrical portions, a single flute extending along said drill body and having defining wall portions extending parallel to the axis of said drill body, said beveled shoulders extending helically at an angle of between two and five degrees to provide axial clearance and limit the rate of feed of said bit into the work, and said flute defining approximately a right angle with its apex generally coincident with the axis of said drill body, whereby approximately three-fourths of the periphery of each cylindrical portion is in continuous contact with the work.

* * * * *